J. NEILSON.
INDICATOR.
APPLICATION FILED MAR. 21, 1910.
1,052,686.
Patented Feb. 11, 1913.
2 SHEETS—SHEET 2.
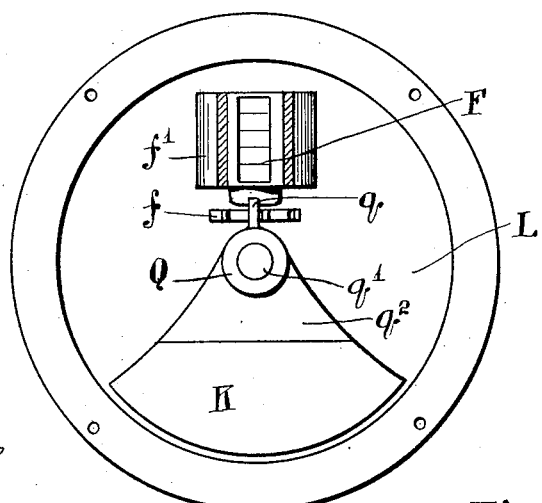
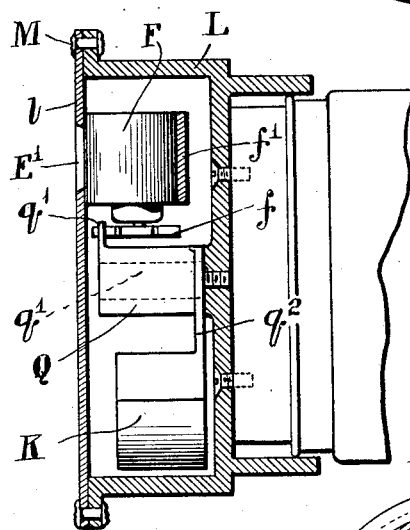
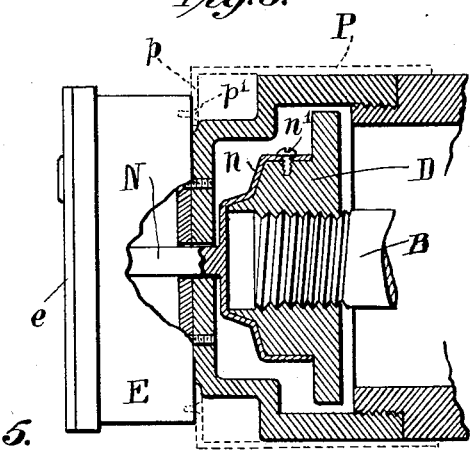
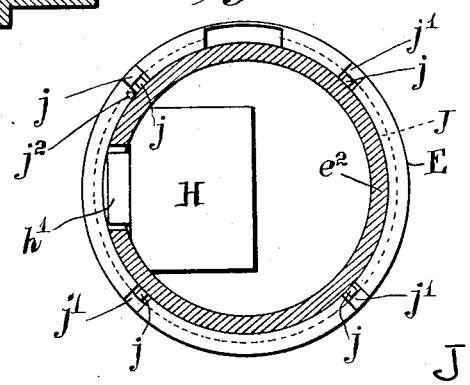
Attest:
Inventor:
John Neilson,
by Donald Campbell
his Atty.

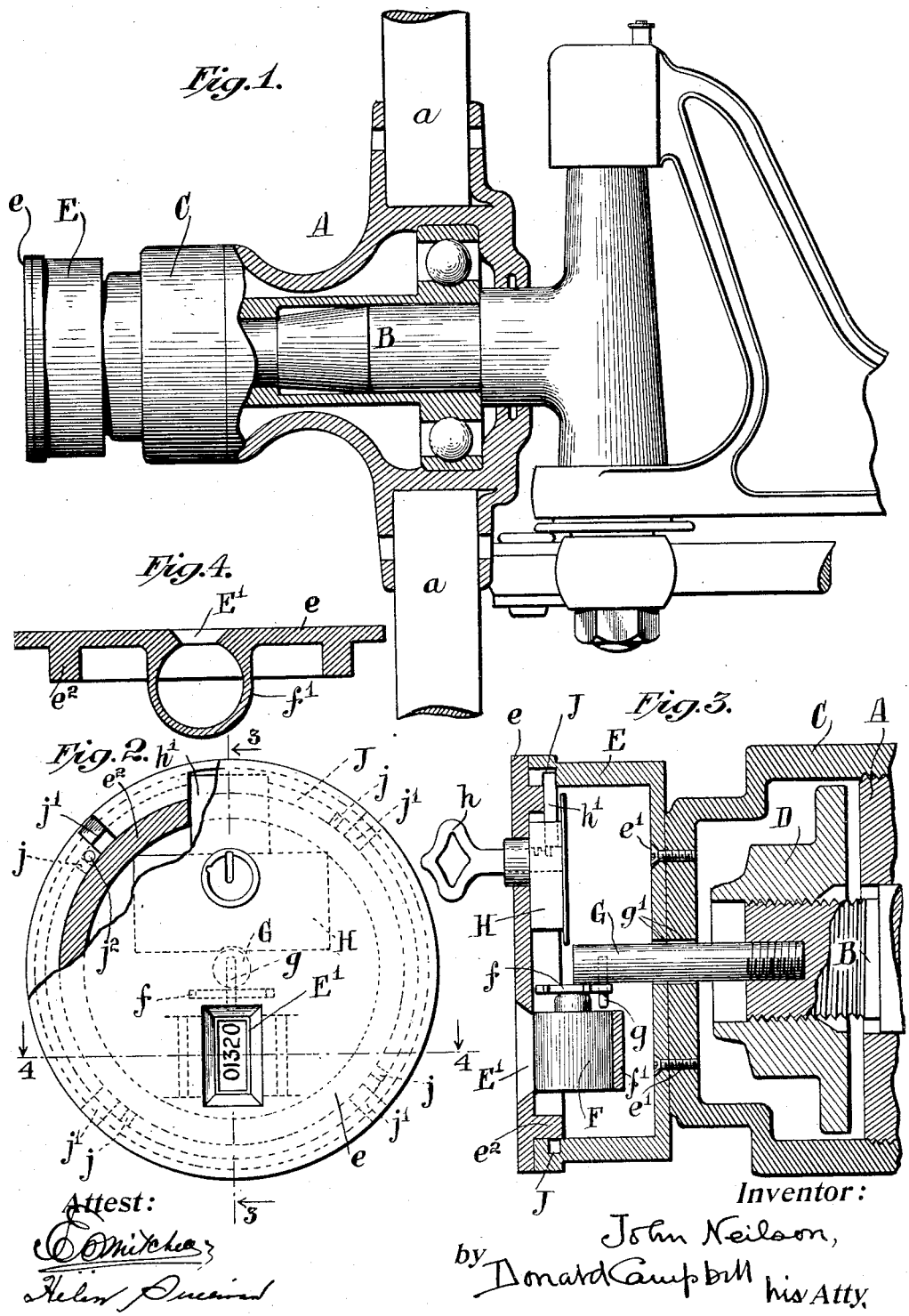

UNITED STATES PATENT OFFICE.

JOHN NEILSON, OF LARCHMONT, NEW YORK, ASSIGNOR OF ONE-HALF TO EUGENE N. ROBINSON, OF NEW YORK, N. Y.

INDICATOR.

1,052,686. Specification of Letters Patent. Patented Feb. 11, 1913.

Application filed March 21, 1910. Serial No. 550,634.

*To all whom it may concern:*

Be it known that I, JOHN NEILSON, a citizen of the United States, residing at Larchmont, county of Westchester, and State of New York, have invented certain new and useful Improvements in Indicators, of which the following is a specification.

My invention relates to indicators for vehicles generally, especially self-propelled vehicles, and for other machines, and has for its particular object the certain indication and detection of operation of the machine by a device which cannot be tampered with or altered to conceal its operation.

I will first describe one or more forms of devices embodying my improvements and will then point out the novel features in the claim.

In the accompanying drawings forming a part hereof, Figure 1 represents in side elevation partly in section, a portion of a self-propelled vehicle, in connection with which is shown in exterior view the preferred form of device embodying my improvements. Throughout the remainder of this specification I will refer to the invention as applied to a self-propelled vehicle or motor vehicle, although it will be understood that the same is applicable to other vehicles and other machinery. Fig. 2 is a side elevation of my invention looking from the left-hand of Fig. 1. Fig. 3 is a central cross-section taken upon the plane 3—3 of Fig. 2. Fig. 4 is a cross-section taken on the plane 4—4 of Fig. 2. Fig. 5 shows certain details of the means for locking my device in closed position. Fig. 6 is an interior elevation of a modified form of the device wherein a weight is employed to keep one of the parts from revolving. Fig. 7 is a partial right-hand elevation, the casing shown in central cross-section. Fig. 8 is a cross-section similar to Fig. 3 but of a still further modification thereof.

Similar letters of reference designate corresponding parts in the several figures of the drawings.

As above explained, my invention is contemplated to be used in association with some revolving member, either of a vehicle or other machine, and in the case of a motor vehicle preferably with the revolving hub of one of the vehicle wheels.

My new indicator, as will be hereinafter described, is of such a strong, simple and compact nature as to enable it to be directly connected to the revolving member or hub, or at least in immediate proximity thereto, thus dispensing with tubing and other long connections frequently employed with different kinds of indicators for motor vehicles.

In its broad aspect my novel indicator comprises as two of its elements, the same to be arranged and combined as hereinafter set forth, a meter or measuring device of some sort and a meter actuating part, one of which elements is mounted to revolve with the wheel hub and the other element to be rendered non-revolving by appropriate means, the whole being inclosed by a compact casing of some sort, either specially provided or otherwise with of course the necessary aperture to enable the examination of the meter.

With the above mentioned parts will be a sealing means which might consist of a lock and key, the same and the inclosing means being so arranged that when locked in place it would be impossible to tamper with or alter the apparatus, any attempt to do so resulting substantially in the destruction of the seal. In the case of a motor vehicle my invention, therefore, unlike the ordinary speedometer or other indicator, affords an absolute means of detecting any unauthorized use of the vehicle, the owner merely having to make a mental or other note of the condition of my indicator and compare it with the condition at a future time. There has in the past among automobile owners been a great deal of trouble with respect to the unauthorized use by mechanics and others of a vehicle, and with all indicators heretofore used it has been possible for a culprit to conceal the fact of his use of the machine by properly disconnecting certain of the parts which are all easily accessible.

Referring to Fig. 1 of the drawings, the same shows certain parts of the front wheel, many of which need not be referred to. The hub is represented at A, this being a revolving part and having spokes *a* which extend to the rim. The hub surrounds an axle B, and has a ball bearing arranged in a usual manner. C represents a hub-cap which is to be screwed into place on the outer end of the hub so as to inclose the axle and other interior parts. The outer end of the axle has an axle nut D. These parts may be of any ordinary design, and my invention is intended to be adaptable to use with axles and hubs of various designs. It will be understood that the order of assembling the parts mentioned in this paragraph is as follows: The hub and ball bearings are fitted into place over the axle. The axle nut is then screwed into place outside of the hub, thereby confining the latter to its proper position. The hub-cap is then screwed into place outside the hub and surrounding the axle nut.

It has above been stated that the meter and the meter actuating part of my invention are to be securely inclosed, and I do not limit myself to any special inclosing means. The same, in fact, may be if convenient inclosed within the hub-cap, if the same be large enough, or the latter may be replaced by a specially made cap of larger size to afford sufficient interior space to accommodate the parts. While the principles of my invention can be utilized in this way, yet I prefer to have a separate casing to be located outside of the hub-cap, since in this way my invention is made adaptable or attachable to any make of motor vehicle.

E represents a special casing or inclosing means constituting a part of my invention, and $e$ a removable cover therefor. The casing E should be concentrically attached to the revolving member of the vehicle or machine, and this may be accomplished when the cover $e$ is removed by screwing the casing E with screws $e'$ or otherwise to the outer surface of the hub-cap. The total thickness of my meter is comparatively small and will not objectionably increase the projection of the hub-cap from the wheel. From the above it will now be understood that when the motor vehicle is in operation, the hub, the hub-cap and the casing E will rotate in unison. On the other hand the axle B, as explained, is a stationary axle in the sense that it does not rotate. Said axle of course swings for the purpose of steering the vehicle, but this swinging movement has no relevance to, or effect upon, the operation of my invention. It will also be seen from the above that it is the immediate proximity of the casing and the revolving hub which permits the operative elements of my invention to be inaccessibly inclosed since the arrangement shown obviates all tube connections or other long connections which might afford means for disconnection by a dishonest employee.

Before describing how the cover $e$ is secured upon the casing E and locked or sealed thereto, I will describe the interior or operative elements of my device. Broadly stating these comprise a meter and a meter actuating part. A convenient form of meter is the so-called "star" meter of the same nature as the cyclometer frequently used upon bicycles, but in the present instance the said meter is differently used. In association therewith will be a pin for actuating the star. Looking at the invention specifically the drawings show the star meter and operating pin, but in place thereof other meters and operating parts might be substituted without altering the principles of my invention. For example, some other forms of meters are the pinion meter, similar to an ordinary gas meter in which the actuating part may be the first cog-wheel or pinion in the series or the means which serves to rotate the same; or the principle of the worm and wheel could be utilized where the worm constitutes the actuating part engaging a wheel forming part of the meter. The star meter, however, is the simplest and most convenient, and I prefer that species for use in my improvement. F indicates such a meter, $f$ representing the star thereof and $g$ representing a pin which actuates the star. The meter F then, and the pin $f$ are the main operative elements of my invention. As before stated, one of these elements is to be arranged to revolve with the hub-cap while the other element is to be non-revolving. As shown in Fig. 3 the meter F is secured to the casing E, or rather for convenience to the cover $e$ thereof, so that when the hub and casing rotate the meter will revolve or be carried around with them. The actuating pin $g$, however, is to be rendered non-revolving by a convenient means, and I prefer that such means shall consist of a connection between said pin and the fixed axle B already referred to. This can be conveniently accomplished by a short pin or post G which is screwed directly into the axle B at the center thereof so as to project outwardly, there being apertures provided at $g'$ in the hub-cap and in the casing E to accommodate the passage of said post G. By this arrangement the pin $g$ is held fixedly in one position, for example pointing downward, as seen in Fig. 3, while the meter F revolving with the casing E passes around and around the post G; and every time the meter passes the underside of the post the star $f$ engages the pin $g$, thereby advancing the star one tooth and operating the meter, the dials of which should be visible upon the outside. An aperture can be arranged at E' in the cover $e$ for examination of the meter, and preferably a piece of glass will be inserted to keep out dust and moisture.

It is obvious that a mere reversal of the meter and actuating pin would not alter the main principles of my invention, since the meter can be mounted fixedly upon the post G opposite to the central aperture and window in the cover $e$, while the pin $g$ could be secured upon either said cover or another wall of the casing, so that on each rotation of the latter the star would as before be advanced one tooth.

I would prefer that the indicating apparatus of my invention should be non-reversible, that is to say that it should not be possible to run the same backward from a given number of rotations or miles so as to indicate a lesser number, for example through the reverse rotation of the front wheel, as this might permit a dishonest employee after an unauthorized use of the vehicle, to restore the condition of the indicator to its original reading. This result might be accomplished in many ways, for example by hinging the pin $g$ that it might yield by contact upon the wrong side, or by the use of a pawl and ratchet in connection with the star wheel or the interior mechanism of the meter.

A convenient way to hold the star meter in place is as indicated in Figs. 3 and 4, where the casting which constitutes the cover $e$ is made with a projection $f'$ of sufficient size to bore through it a hole corresponding in dimensions with the meter so as to receive and hold the same. The details of the star meter are not indicated in the drawings as they are well known, it being sufficient to indicate the position of the meter. The star wheel, however, is indicated in each instance to show its coöperation with its actuating pin.

H represents a lock for locking the cover $e$ in place, and it is obvious that when locked in place the entire device is rendered incapable of detachment as the screws $e'$ which attach the casing to the hub-cap are then inaccessible. It is also obvious from Fig. 3 that it would be impossible for the hub-cap to be removed and another one substituted temporarily since the apertures at $g'$ are insufficient to allow the pin $g$ to pass through them, and though the hub-cap might be unscrewed, it could not be removed. To force it off would cause the destruction of the pin $g$ or other parts and thus indicate to the owner that the indicator had been tampered with.

$h$ represents a key for operating the lock H, and $h'$ is the bolt of the lock. Said bolt might engage with a bolt hole conveniently arranged at one side, or a plurality of bolts would serve to engage the casing E on both sides. I, however, have provided a circumferential groove J a slight distance within the casing and formed directly in its wall. The cover $e$ has a flange $e^2$ which fits within the casing walls and upon said flange are formed a plurality of projections, four of them being shown, the same intended to engage in the groove J. To permit the cover to be inserted, four passageways are formed at $j'$ corresponding to the four projections $j$. Upon applying the cover and permitting said projections to enter the passageways, the projections are thereby brought within the groove J and thereupon the cover is to be turned to the right, that is to the position shown in Fig. 5, this partial revolution serving to carry the projections $j$ into parts of the groove that are in opposite passageways. A stop pin $j^2$ is encountered by one of the projections $j$ which determines the proper relative position of the parts, and when in this position the key $h$ is to be turned, causing the bolt $h'$ of the lock to be shot outwardly, the bolt thereby passing into a sink or depression in the casing wall as shown in Fig. 2. In this position the bolt prevents the cover from being turned to the left, and the cover is thereby absolutely locked in position and is held from being forced outwardly by the four projections $j$ engaging in the groove J. While not shown in the drawings, the key-hole should be provided with a slide or swinging cover or other means for protecting it from ingress of dust, moisture, etc.

Instead of a lock and key, a soft metal seal might be employed in many cases to advantage, and this would be accomplished by having corresponding apertures in portions of the casing E and its cover $e$, through both of which apertures a soft metal plug could be inserted and squeezed into place by a private sealing device of the owner, so that as before the apparatus could not be opened without indicating that the same had been tampered with.

It was before stated that the post G was only one convenient means of holding the pin $g$ from revolving. In some instances the fixed axle B might be inaccessible, and in other instances the axle might rotate with the wheel. In these and other cases the modification shown in Figs. 6 and 7 may be employed. In this modification a counter-weight is substituted as a means for preventing the revolution of one of the elements, the meter or the actuating pin.

K is a counter-weight which gravity maintains in a position directly below the center of the apparatus so that said counter-weight and the parts attached thereto are substantially stationary, any small oscillations thereof being immaterial to the operation of the apparatus. As before, the revolving casing is retained, it being marked L in this modification. It has a cover $l$, and a sealing device for the casing and cover is shown at M, there being corresponding apertures in the cover or casing or the flanges thereof to permit the soft metal plug M to be inserted through both apertures, whereupon it will be flattened or pressed out with a private sealing device as before explained. This sealing device is superior to a lock and key in that it obviates the disadvantages of a key-hole which is likely to clog up with dust, moisture, etc.

As shown in Figs. 6 and 7, the counter-weight K carries not the meter in this instance, but the actuating pin $q$. Connecting the pin $q$ and the counter-weight is a sleeve Q, loosely mounted upon a stud $q'$ secured centrally within the casing, there being a bar $q^2$ extending from the sleeve to the counter-weight. This arrangement results in the actuating pin $q$ always pointing upwardly irrespective of the rotation of the casing. The meter F is shown as before mounted to revolve with the casing, its star wheel $f$ coming opposite the pin $q$ at each revolution to cause the operation of the meter.

While in Fig. 3 the post G is shown screwed directly into the threaded aperture formed in the end of the fixed axle, this might in some cases be objectionable and the modification of Fig. 8 may in such instances be superior in avoiding the necessity of any weakening of the axle that might result from boring a considerable hole therein. In Fig. 8 the parts are generally similar to the parts in the main figures of the drawings, except that the stationary post which is marked N in this instance, is not screwed into the fixed axle but is provided with, or expanded into the form of a bell $n$ at its interior end, this bell being of a shape to inclose or embrace the axle nut D. The latter usually being hexagonal, the bell will take the same form and the two will consequently have a rigid connection so that the axle being stationary, the bell and the post N will also be stationary. A small screw $n'$ may be employed to hold the post and bell from longitudinal movement, said screw passing through the bell and into the axle nut D.

As already explained it will be impossible to surreptitiously remove the hub-cap and indicator of my invention and temporarily replace them with another hub-cap, for the reason that this would cause destruction of parts and therefore detection; but in case an extra precaution should be desired, this might be in the form of a cup P, Fig. 8, of a size to just inclose the hub-cap and of such a depth that the cup may entirely cover the hub-cap. Cup P is shown with a flange $p$ extending inwardly to a point where it may be connected as by screws $p'$ to the casing E.

Among other modifications, the casing cap may be simply screw closed, or the casing screw upon the hub-cap; the post G may be in the nut D if the metal of the latter should extend across the axle end; etc.

What I claim as new and desire to secure by Letters Patent, is:

In combination with indicating mechanism, an indicator casing having a circular cover, said casing having an interior circular interrupted groove, with perpendicular passageways leading thereto, said cover having a plurality of outward projections corresponding to said passages, whereby said projections may be introduced into said circular groove and said cover may be turned until an interruption is encountered, and a locking or sealing device to hold the cover from being turned back.

In witness whereof I have hereunto set my hand, this 19th day of March, 1910.

JOHN NEILSON.

Witnesses:
 CONRAD A. DIETERICH,
 DONALD CAMPBELL.